United States Patent
Lee

(10) Patent No.: US 7,050,398 B1
(45) Date of Patent: May 23, 2006

(54) SCALABLE MULTIDIMENSIONAL RING NETWORKS

(75) Inventor: Byoung-Joon Lee, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 990 days.

(21) Appl. No.: 09/749,482

(22) Filed: Dec. 26, 2000

(51) Int. Cl.
*H04L 12/26* (2006.01)
*H04L 12/28* (2006.01)

(52) U.S. Cl. .................................. 370/238; 370/254
(58) Field of Classification Search ................ 370/221, 370/222, 223, 224, 465, 238, 254
See application file for complete search history.

(56) References Cited

U.S. PATENT DOCUMENTS

| | | | |
|---|---|---|---|
| 5,841,775 A | 11/1998 | Huang | 370/422 |
| 5,898,826 A | 4/1999 | Pierce et al. | 395/182.02 |
| 5,898,827 A | 4/1999 | Hornung et al. | 395/182.09 |
| 6,269,452 B1 | 7/2001 | Daruwalla et al. | |
| 6,314,110 B1 | 11/2001 | Chin et al. | |
| 6,505,289 B1 * | 1/2003 | Han et al. | 712/11 |
| 6,744,769 B1 * | 6/2004 | Siu et al. | 370/222 |
| 6,775,295 B1 * | 8/2004 | Lothberg et al. | 370/465 |

OTHER PUBLICATIONS

"Spatial Reuse Protocol Technology" (white paper published by Cisco Systems, Inc.), http://www.cisco.com/warp/public/cc/techno/wnty/dpty/tech/srpmc_wp.pdf, downloaded May 29, 2001 (37 pp.).

"Overview—OC-12c Dynamic Packet Transport Adapter Installation and Configuration," http://www.cisco.com/univercd/cc/td/doc/product/core/7200vx/portadpt/pa_dpt/pa_srp/5481over.pdf, downloaded May 29, 2001 (10 pp.).

* cited by examiner

*Primary Examiner*—Andrew C. Lee
(74) *Attorney, Agent, or Firm*—Hamilton, Brook, Smith & Reynolds, P.C.

(57) ABSTRACT

The present invention provides a method, apparatus and article of manufacture for increasing network processing node interconnect capacity and reducing maximum hop count in a scalable multidimensional ring network by creating additional rings. Initially a node identification algorithm is selected and an initial network processing node in the scalable multidimensional ring network is selected as a first node in a new ring. The node identification algorithm is applied to the selected node to calculate a subsequent node in the new ring. The calculated node is then made the selected node. The applying and selecting steps terminate when applying the node identification algorithm to the selected node results in the calculated subsequent node being equal to the initial node, thereby creating the new ring. A new initial node is then selected and the new ring creation process continues. When a new initial node is selected that is already a member of a new ring the entire process terminates, thereby creating all the new rings in the new scalable multidimensional ring network.

9 Claims, 8 Drawing Sheets

SCALABLE MULTIDIMENSIONAL RING NETWORKS

RELATED APPLICATIONS

This application is related to U.S. Patent entitled "SCALABLE MULTIDIMENSIONAL RING NETWORK" by P. Lothberg and A. Bates, filed Mar. 23, 2000, application Ser. No. 09/535,437, now U.S. Pat. No. 6,775,295 issued Aug. 10, 2004, which is incorporated in its entirety by reference herein. This application is also related to U.S. entitled METHOD AND APPARATUS FOR DISTRIBUTED BANDWIDTH ALLOCATION FOR A BI-DIRECTIONAL RING MEDIA WITH SPATIAL AND LOCAL REUSE and U.S. Ser. No. 09/067,482 filed Apr. 27, 1998, now U.S. Pat. No. 6,269,452, issued Jul. 31, 2001, entitled SYSTEM AND METHOD FOR FAULT RECOVERY FOR A TWO LINE BI-DIRECTIONAL RING NETWORK, both of which are incorporated in their entirety by reference herein.

BACKGROUND OF THE INVENTION

This invention relates generally to scalable multidimensional ring networks, and more specifically to increasing the connectivity of a scalable multidimensional ring network by providing additional rings.

Communications networks are comprised of network processing nodes, such as modems, routers, switches. These network processing nodes are interconnected using various signal carrying media, for example optical fiber, co-axial, satellite and wireless transmitters. The communications networks can be designed in many different configurations to solve existing problems, such as scalability, performance, bandwidth and redundancy.

One existing architecture, a scalable multidimensional ring network, described in U.S. patent application entitled "SCALABLE MULTIDIMENSIONAL RING NETWORK" by P. Lothberg and A. Bates, filed Mar. 23, 2000, application Ser. No. 09/535,437 includes a plurality of network processing nodes that are connected together with a plurality of individual ring networks. Packets, which are units of information, are transmitted between any two network processing nodes on the same individual ring network. Intermediate network processing nodes located on the same ring, between the sending and receiving processing devices, do not add additional hops (transmissions from node to node in a communications network) to the packet transfer. The intermediate processing devices simply pass the packets through to the next network processing device on the same ring. The packets are passed through to the destination network processing device without the intermediate processing devices having to read or process the packet headers. This allows the number of network processing nodes and the number of individual ring networks in the scalable multidimensional ring network to be increased without adding additional hops, and the associated latency, between network processing nodes.

Communications networks configured in a scalable multidimensional ring can be arranged into a three-dimensional cube having X, Y and Z axes. The individual ring networks in this architecture interconnect the network processing nodes logically aligned along the same rows and columns in the same planes of the cube. An advantage of a three-dimensional cube ring network is that it takes a maximum of only three hops to send information between any two nodes within the communications network. Only one hop is required to send information between any two nodes connected on the same ring. A three-dimensional cube ring network can be expanded without increasing the maximum number of hops, for example a 3×3×3 three-dimensional cube network and a 4×4×4 three-dimensional cube ring network both only requires a maximum of three hops to transfer information between any two nodes in the network.

The individual ring networks connecting network processing nodes can be implemented as bidirectional rings over Wide Area Network ("WAN") links, Local Area Network ("LAN") links or other bus or backplane interconnections. The particulars of the bi-directional ring architectures are described in the two previously referenced co-pending patent applications: U.S. Ser. No. 09/036,539 filed Mar. 6, 1998 entitled METHOD AND APPARATUS FOR DISTRIBUTED BANDWIDTH ALLOCATION FOR A BI-DIRECTIONAL RING MEDIA WITH SPACIAL AND LOCAL REUSE and U.S. Ser. No. 09/067,482 filed Apr. 27, 1998 entitled SYSTEM AND METHOD FOR FAULT RECOVERY FOR A TWO LINE BI-DIRECTIONAL RING NETWORK.

SUMMARY OF THE INVENTION

The present invention reduces the maximum number of hops needed to transfer information between any two nodes in a scalable multidimensional ring network from three hops to two hops by adding new rings along an additional axis, the W-axis. The creation of the new rings is independent of which node is chosen as the starting node, any starting node produces the same topology. The creation of the new rings is also independent of the walking order used to select the next node in the new ring. The new W-axis rings increase (total available) interconnect capacity and the reduce maximum hop count while maintaining symmetric and regular topology. Symmetric and regular network topology provides ease and simplicity for network operations and maintenance, thus improving network scalability and performance.

The present invention provides a method, apparatus and article of manufacture for increasing network processing node interconnect capacity and reducing maximum hop count in a scalable multidimensional ring network by creating additional rings. Initially a node identification algorithm is selected and an initial network processing node in the scalable multidimensional ring network is selected as a first node in a new ring. The node identification algorithm is applied to the selected node to calculate a subsequent node in the new ring. The calculated node is then made the selected node. The applying and selecting steps are repeated, and terminate when applying the node identification algorithm to the selected node results in the calculated subsequent node being equal to the initial node, thereby creating the new ring. A new initial node is then selected and the new ring creation process continues. When a new initial node is selected that is already a member of a new ring the entire process terminates, thereby creating all the new rings in the new scalable multidimensional ring network.

Reducing the maximum number of hops needed to transfer information between any two nodes in a scalable multidimensional ring network from three hops to two hops increases the interconnect capacity of links between nodes within the scalable multidimensional ring network. This increase in interconnect capacity allows more external input/output connections into the scalable multidimensional ring network. In certain specific configurations a 33% increase (from 6 to 8) in the number of ports allocated to interconnect nodes in the scalable multidimensional ring network has resulted in an 80% increase in available external input/output connection capacity for the scalable multidimensional ring network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
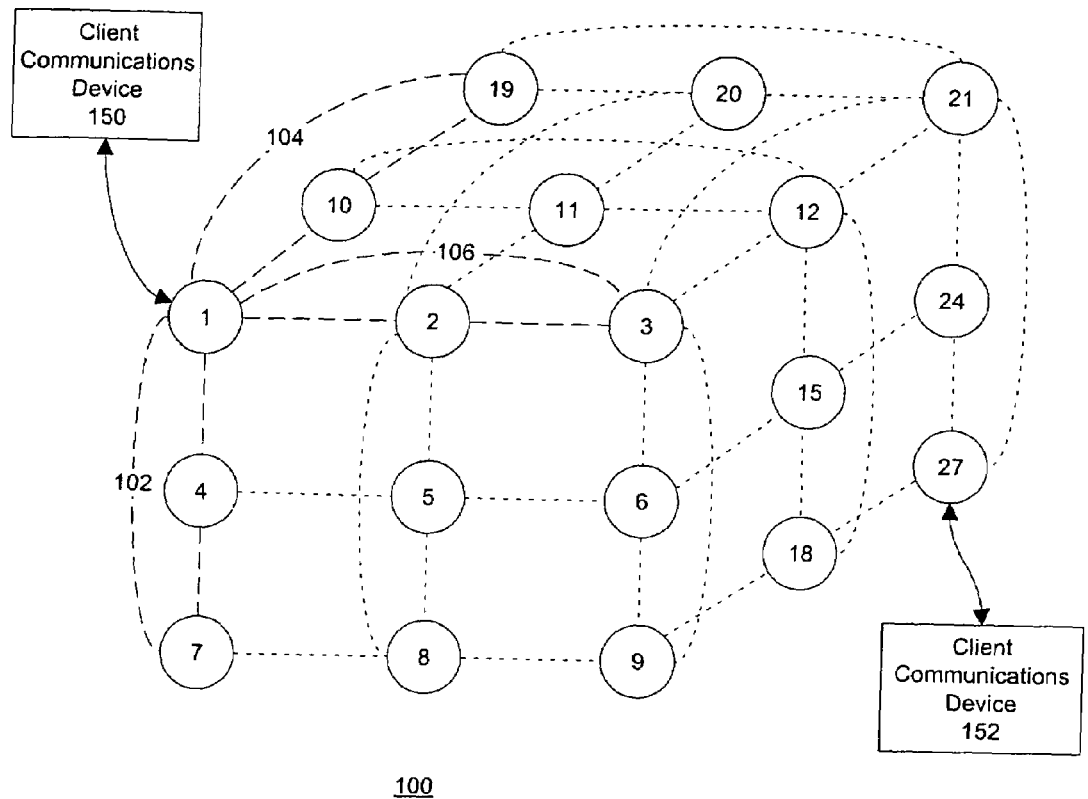
FIG. 1 is a diagram of a scalable multidimensional ring network.
Figure 1:
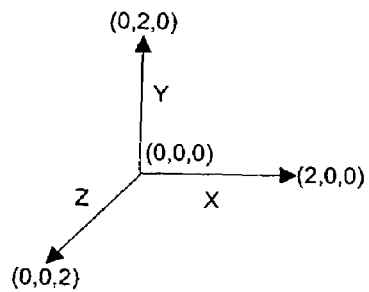

FIG. 1 is a diagram of a scalable Multidimensional Ring Network ("MRN") 100. The MRN 100 is constructed of twenty-seven individual ring networks ("rings") arranged along three axes, the X-axis, the Y-axis and the Z-axis. The individual rings connect three Network Processing Nodes ("NPN") 1–27 along one of an X, Y or Z axis. An example individual ring in each of the X-axis (106), Y-axis (102) and Z-axis (104) is also shown. The full set of twenty-seven individual rings in a 3×3×3 cube MRN 100 of NPNs 1–27 is listed below:

| X-axis: | | |
|---|---|---|
| {1, 2, 3} | {10, 11, 12} | {19, 20, 21} |
| {4, 5, 6} | {13, 14, 15} | {22, 23, 24} |
| {7, 8, 9} | {16, 17, 18} | {25, 26, 27} |

| Y-axis: | | |
|---|---|---|
| {1, 4, 7} | {10, 13, 16} | {19, 22, 25} |
| {2, 5, 8} | {11, 14, 17} | {20, 23, 26} |
| {3, 6, 9} | {12, 15, 18} | {21, 24, 27} |

| Z-axis: | | |
|---|---|---|
| {7, 16, 25} | {4, 13, 22} | {1, 10, 19} |
| {8, 17, 26} | {5, 14, 23} | {2, 11, 20} |
| {9, 18, 27} | {6, 15, 24} | {3, 12, 21}. |

The X-axis, Y-axis and Z-axis coordinates of the above twenty-seven NPNs is listed below:

| | |
|---|---|
| NPN 1 | (0, 2, 2) |
| NPN 2 | (1, 2, 2) |
| NPN 3 | (2, 2, 2) |
| NPN 4 | (0, 1, 2) |
| NPN 5 | (1, 1, 2) |
| NPN 6 | (2, 1, 2) |
| NPN 7 | (0, 0, 2) |
| NPN 8 | (1, 0, 2) |
| NPN 9 | (2, 0, 2) |
| NPN 10 | (0, 2, 1) |
| NPN 11 | (1, 2, 1) |
| NPN 12 | (2, 2, 1) |
| NPN 13 | (0, 1, 1) |
| NPN 14 | (1, 1, 1) |
| NPN 15 | (2, 1, 1) |
| NPN 16 | (0, 0, 1) |
| NPN 17 | (1, 0, 1) |
| NPN 18 | (2, 0, 1) |
| NPN 19 | (0, 2, 0) |
| NPN 20 | (1, 2, 0) |
| NPN 21 | (2, 2, 0) |
| NPN 22 | (0, 1, 0) |
| NPN 23 | (1, 1, 0) |
| NPN 24 | (2, 1, 0) |
| NPN 25 | (0, 0, 0) |
| NPN 26 | (1, 0, 0) |
| NPN 27 | (2, 0, 0) |

Client communications devices 150, 152 can be connected to the MRN 100 at any NPN 1–27 and provide an interface for clients to connect to the MR 100. An example NPN 1–27 on MRN 100 is the Cisco 12016 Gigabit Switch Router ("GSR"), a scalable, carrier-class routing platform network infrastructure providing 10 Gbps (OC-192c/STM-64) capability.

A legend providing orientation of NPNs 1–27 along each of the X, Y and Z axes is also shown. In this illustration the orientation of the origin of the MRN is in the back, left, bottom corner (0,0,0). The X-axis is orientated horizontally from the origin, increasing from left to right. The Y-axis is orientated vertically from the origin, increasing from bottom to top. The Z-axis is orientated depth-wise from the origin, increasing from back to front.

Figure 2:
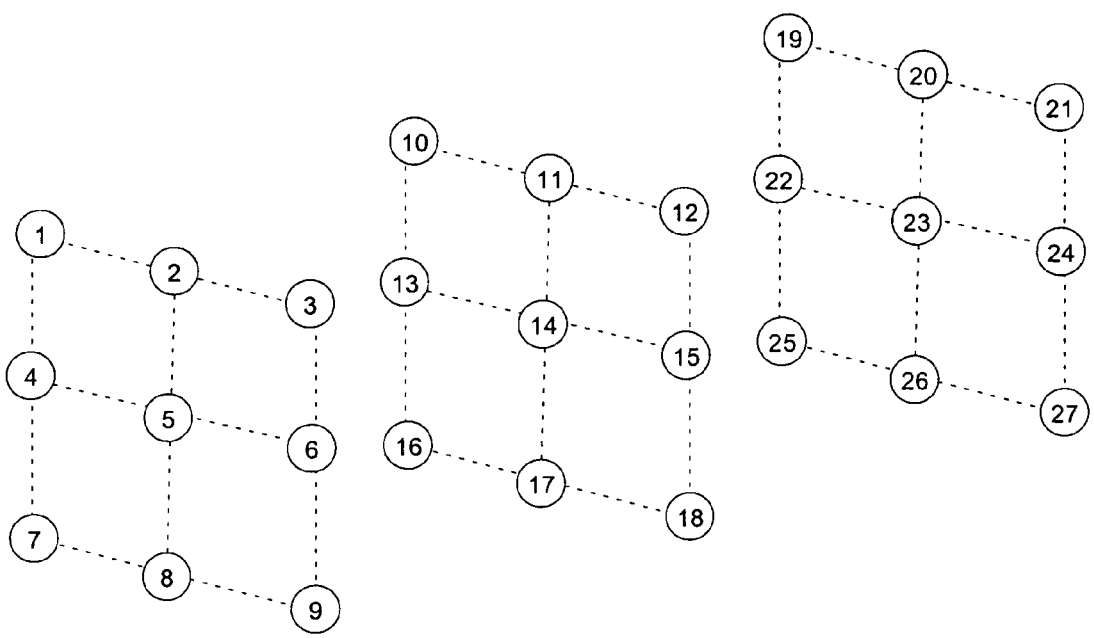
FIG. 2 is a diagram of the scalable multidimensional ring network shown in FIG. 1 with nodes shown in full view along the Z-axis.

FIG. 2 is a diagram of the scalable multidimensional ring network shown in FIG. 1 with nodes shown in full view along the Z-axis. Some of the NPNs (i.e., 13–14, 16–17, 22–23 and 25–26) of the MRN 100 are hidden in FIG. 1. In FIG. 2 the MRN 100 is shown as three vertical X–Y planes, illustrating all the NPNs 1–27 of MRN 100. A first vertical plane of MRN 100 contains NPNs 1–9. A second vertical plane of MRN 100 contains NPNs 10–18. A third vertical plane of MRN 100 contains NPNs 19–27. Each NPN 1–27 is connected along each of the three X, Y and Z axes to construct a cube. FIG. 2 illustrates a 3×3×3 cube, but other configurations of the cube can include more or less than three NPNs 1–27 along each axis.

Figure 3:
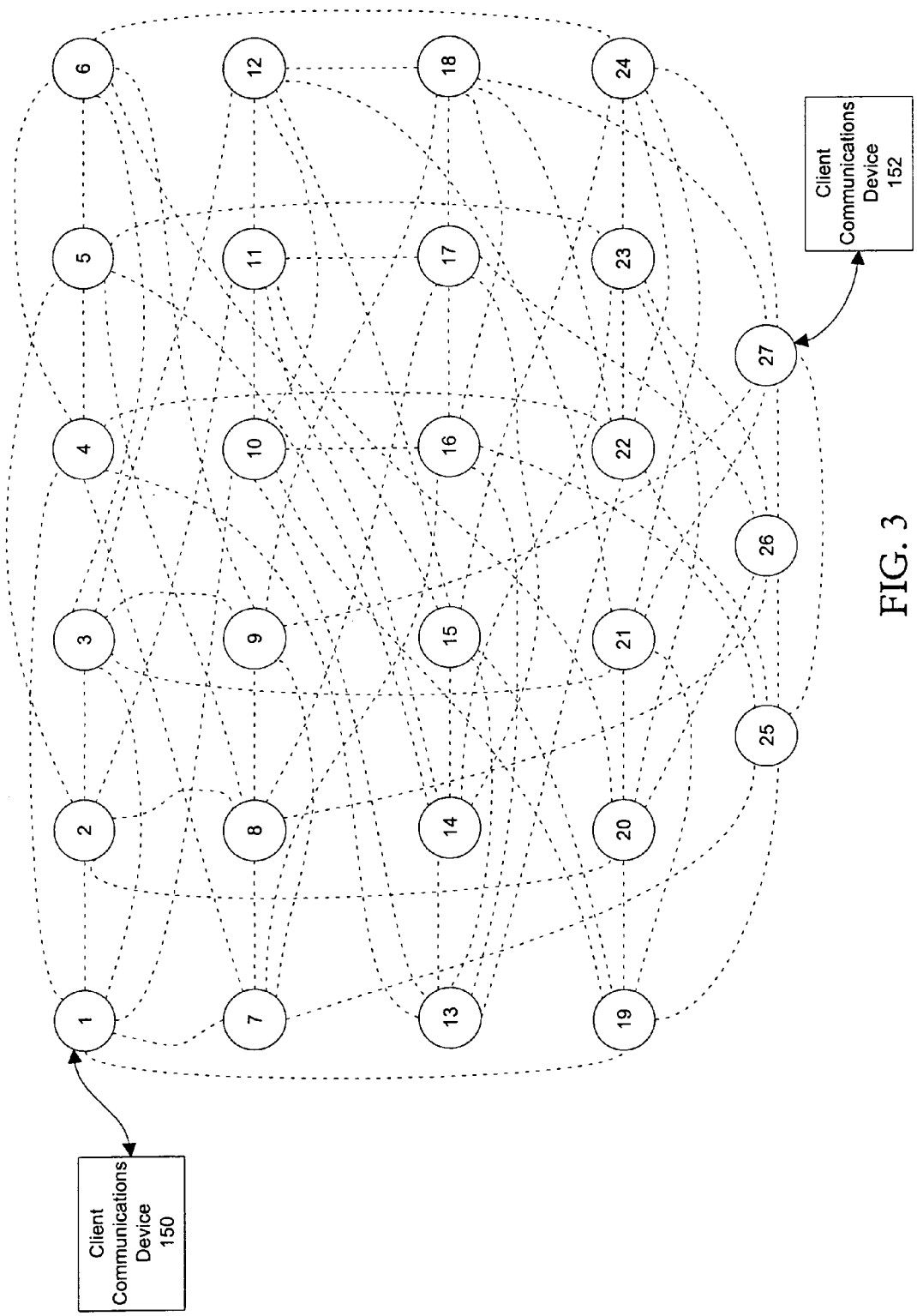
FIG. 3 is a connectivity map showing all network processing nodes in the scalable multidimensional ring network shown in FIG. 1.

FIG. 3 is a connectivity map showing all network processing nodes in the scalable multidimensional ring network shown in FIG. 1. All twenty-seven rings are shown. In the case in which client communications device 150 desires to send a packet to client communications device 152 three hops are required. The packet travels from NPN 1 (connected to client communications device 150) to NPN 19, from NPN 19 to NPN 21, then from NPN 21 to NPN 27 (connected to client communications device 152). Alternate paths from NPN 1 to NPN 27 exist, but all require a minium of three hops between NPNs 1–27, because NPN 1 differs from NPN 27 in each of the 3 dimensions (X, Y, and Z) on which individual rings are defined.

Figure 4:
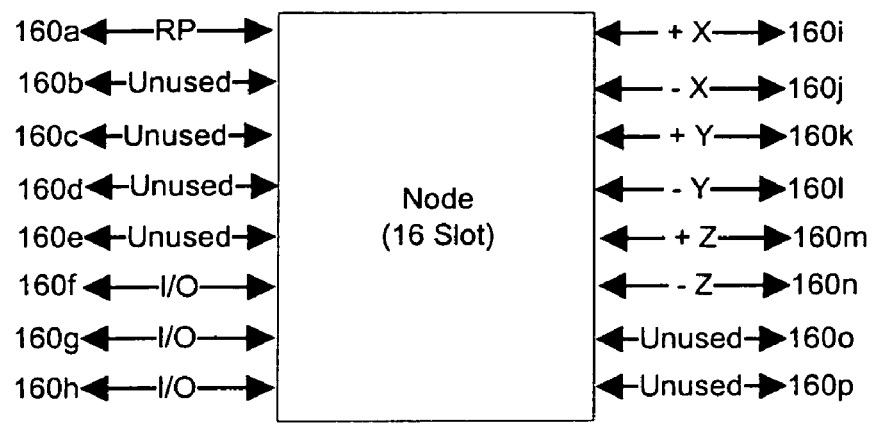
FIG. 4 is a diagram of a network processing node on a scalable multidimensional ring network connected along three axes.

FIG. 4 is a diagram of a node processing node on a scalable multidimensional ring network connected along three axes. Each NPN 1–27 provides interfaces for connecting Input/Output devices, processing equipment and other NPNs 1–27. In one example a node is a sixteen slot GSR providing interfaces 160a–160p. Six slots (160i–160n) are used to interface the NPNs 1–27 bi-directionally, along each of the X, Y and Z axes. Other slots are used for connecting I/O devices (160f–160h), for example client communications devices 150, 152. Additional slots on the NPN 1–27 can also be used for process cards, for example route processor (RP) cards (160a). A route processor runs software (e.g., Cisco's Internet Operating System) for handling network routing protocols (e.g., EIGRP, IGRP, OSPF, IS—IS, BGP). Network routing protocols exchange and calculate route information among routers. The calculated routing table is distributed to other RP cards in other NPNs 1–27. Route Processors can also provide system management functions including: Simple Network Management Protocol ("SNMP"), console support and diagnostics. Other slots may be idle, and unused (160b–160e and 160o–160p), providing capacity for additional I/O connections, backup Route Processors or new rings.

In a specific configuration depicted by FIG. 4, only three slots contain I/O devices. Based upon an assumption of 100% utilization of interconnect capacity and uniform distribution of traffic within the scalable multidimensional ring network this configuration will max-out using three I/O devices connected to external nodes. As will be seen in FIG. 7, the addition of the W axis for connection within the scalable multidimensional ring network will allow the number of I/O devices to increase to five, thus increasing the capacity of the communications network.

Figure 5:
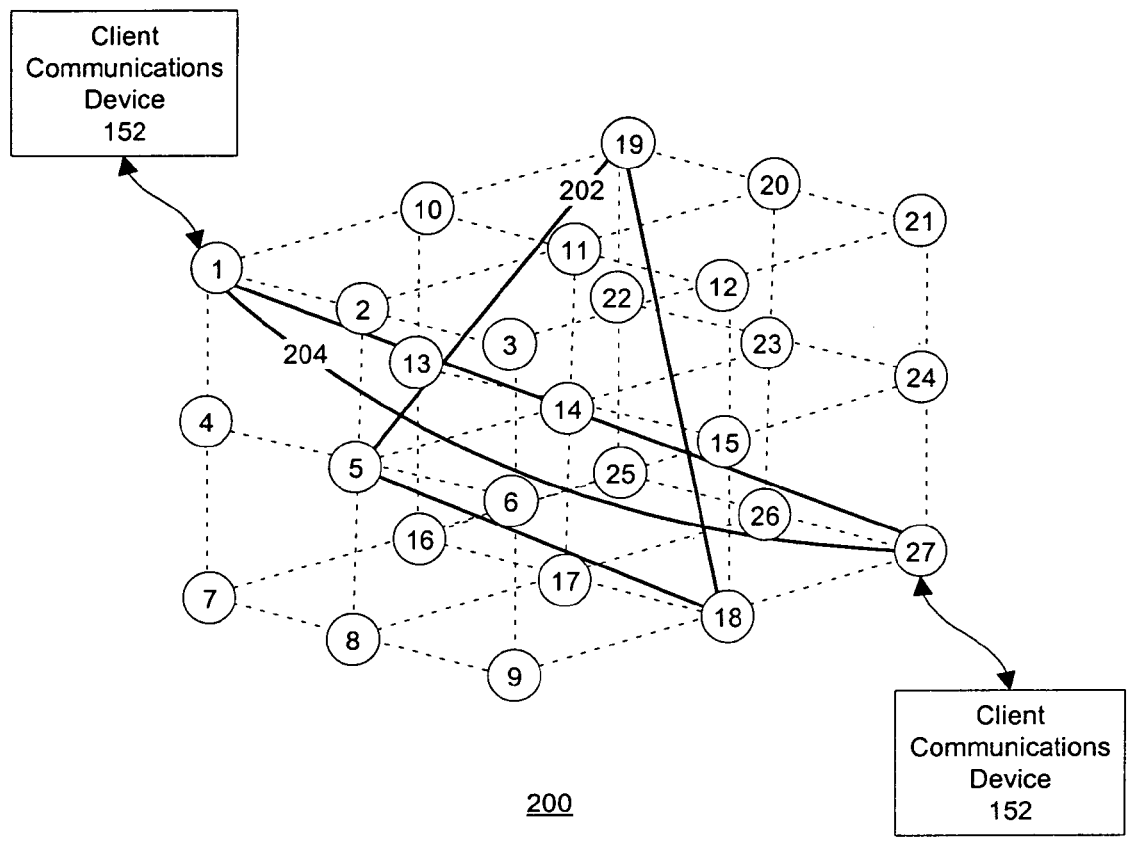
FIG. 5 is a diagram of a scalable multidimensional ring network configured according to an embodiment of the present invention.

FIG. 5 is a diagram of a scalable multidimensional ring network configured according to an embodiment of the present invention. The configuration adds an additional nine rings and reduces the maximum hop count to two hops. The new rings are constructed on an additional axis, the W-axis using an algorithm that starts at an arbitrary NPN 1–27 and identifies other NPNs 1–27 within the MRN 100 that are one hop away in any direction. Rings wrap-around so arithmetic used in ring creation is modulo based on dimension. For example, an algorithm of (+X, −Y, −Z) represents a "rightward" movement along the X-axis, a "downward" movement along the Y-axis and a "backward" movement along the Z-axis. Given a NPN 1–27 identified as (i, j, k) the algorithm would calculate a new ring as ((i+1)%3, (j−1)%3, (k−1)%3). The (+X, −Y, −Z) algorithm will now be used to calculate nine new rings on the MRN 100 to produce new MRN 200. FIG. 5 illustrates two of the newly calculated rings 202 and 204. As an illustration, the steps of calculating new ring 202 are described below.

a) a starting node (NPN 5) and algorithm (+X, −Y, −Z) are chosen.
b) the coordinates of NPN 5 (1,1,2) are input into the algorithm
c) the algorithm is executed
selected node=NPN 5 (1,1,2)
((1+1)%3, (1−1)%3, (2−1)%3)=(2,0,1)=calculated NPN 18
d) the coordinates of NPN 18 (2,0,1) are input into the algorithm
e) the algorithm is executed
selected node=NPN 18 (2,0,1)
((2+1)%3, (0−1)%3, (1−1)%3)=(0,2,0)=calculated NPN 19

The nodes of the new ring 202 are now all selected. The steps of the process can stop when the next selected node is the starting node (e.g., NPN 19->(+X, −Y, −Z)->NPN 5) or when a specific number (e.g., 3) of nodes have been processed (e.g., NPN 5, NPN 18, NPN 19).

A table of the nine new rings created on MRN 200 using (+X, −Y, −Z) follows:

Ring 1: {1, 14, 27}
   NPN 1  (0, 2, 2)
   NPN 14 (1, 1, 1)
   NPN 27 (2, 0, 0)
Ring 2: {2, 15, 25}
   NPN 2  (1, 2, 2)
   NPN 15 (2, 1, 1)
   NPN 25 (0, 0, 0)
Ring 3: {3, 13, 26}
   NPN 3  (2, 2, 2)
   NPN 13 (0, 1, 1)
   NPN 26 (1, 0, 0)
Ring 4: {4, 17, 21}
   NPN 1  (0, 1, 2)
   NPN 17 (1, 0, 1)
   NPN 21 (2, 2, 0)
Ring 5: {5, 18, 19}
   NPN 5  (1, 1, 2)
   NPN 18 (2, 0, 1)
   NPN 19 (0, 2, 0)
Ring 6: {6, 16, 20}
   NPN 6  (2, 1, 2)
   NPN 16 (0, 0, 1)
   NPN 20 (1, 2, 0)
Ring 7: {7, 11, 24}
   NPN 7  (0, 0, 2)
   NPN 11 (1, 2, 1)
   NPN 24 (2, 1, 0)
Ring 8: {8, 12, 22}
   NPN 8  (1, 0, 2)
   NPN 12 (2, 2, 1)
   NPN 22 (0, 1, 0)
Ring 9: {9, 10, 23}
   NPN 9  (2, 0, 2)
   NPN 10 (0, 2, 1)
   NPN 23 (1, 1, 0)

Creation of new rings can stop when the first NPN 1–27 is encountered that is already a member a new ring (e.g., in the above illustration, attempting to process NPN 10 using the (+X, −Y, −Z) algorithm yields the ring {10, 23, 9}, which is already defined as Ring 9).

Alternate algorithms exist for the selection of nodes on the new rings. Selection can be determined by physical distance, wiring/connection media, equipment type as well as other physical and logical determinations. The key requirement is that once the new rings are constructed each node still has an equal number of neighbors (e.g., 8). Neighbors are nodes that are one hop away. For example NPN 1 has six neighbors (e.g., 10, 2, 4, 19, 7, 3) in a three-dimensional X, Y, Z scalable multidimensional ring network and eight neighbors (e.g., 10, 2, 4, 19, 7, 3, 14, 27) in a four-dimensional X, Y, Z, W scalable multidimensional ring network.

The addition of new rings (W-axis rings) maintains topological regularity and symmetry by providing that all NPNs 1–27 have the same number of neighbors (i.e., 2 per dimension=8). The total number of rings increases from twenty-seven to thirty-six, but the number of NPNs 1–27 on each rings remains at three (ensuring maximum spatial reuse).

Figure 6:
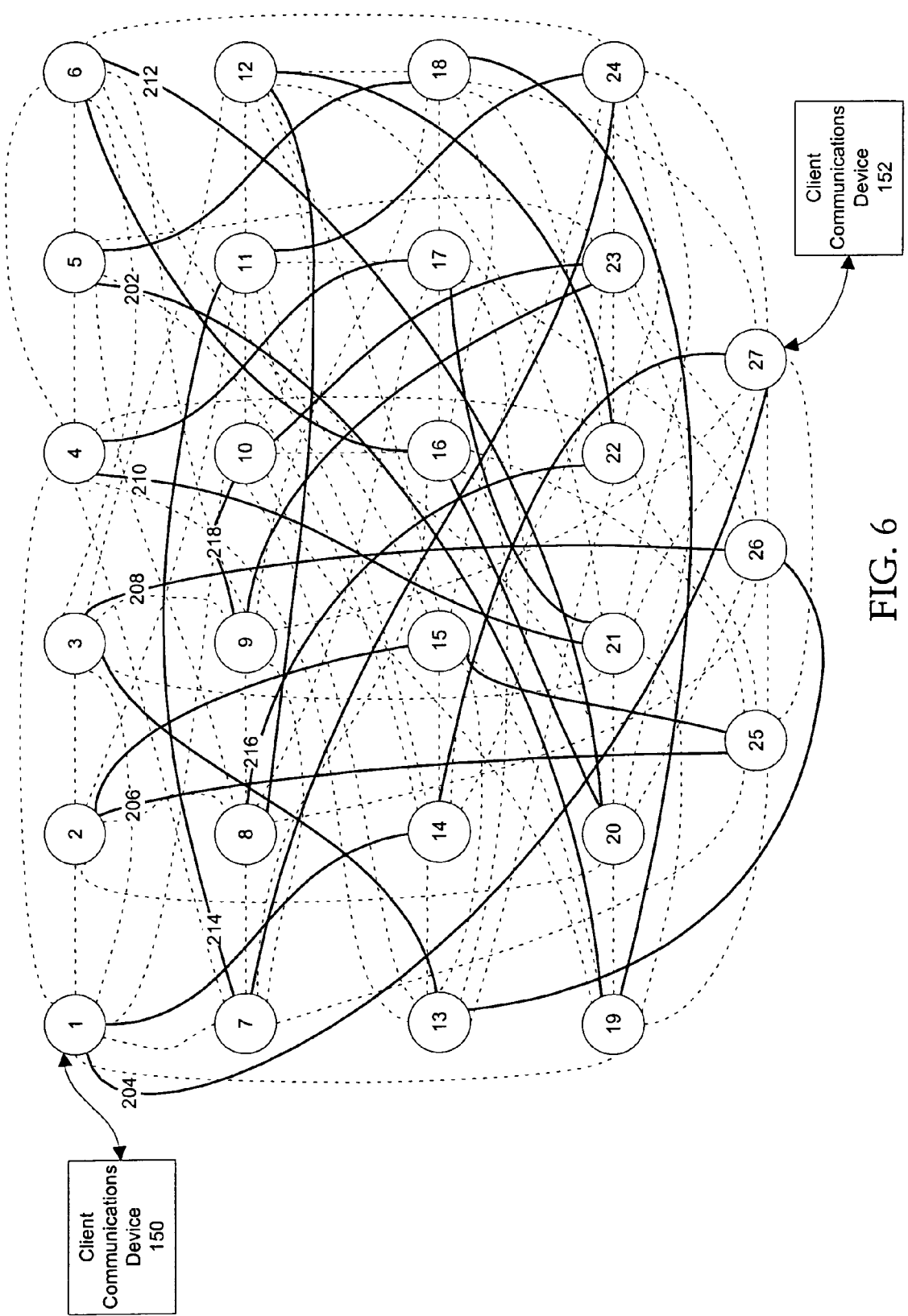
FIG. 6 is a connectivity map showing all network processing nodes in the scalable multidimensional ring network shown in FIG. 1.

FIG. 6 is a connectivity map showing all network processing nodes in the scalable multidimensional ring network shown in FIG. 5. All twenty-seven original rings are shown as dashed lines. The additional nine new rings (204, 206, 208, 210, 202, 212, 214, 216, 218) are shown as solid black lines. In the case in which client communications device 150 desires to send a packet to client communications device 152 only two hops are required. The packet travels from NPN 1 (connected to client communications device 150) to NPN 14, and from NPN 14 to NPN 27 (connected to client communications device 152). Alternate paths from NPN 1 to NPN 27 exist, but all require a minium of three hops between NPNs 1–27, because NPN 1 differs from NPN 27 in each of the 3 dimensions (X, Y, and Z) on which individual rings are defined. The addition of a ring along the W-axis reduces the hop count to two hops.

Figure 7:
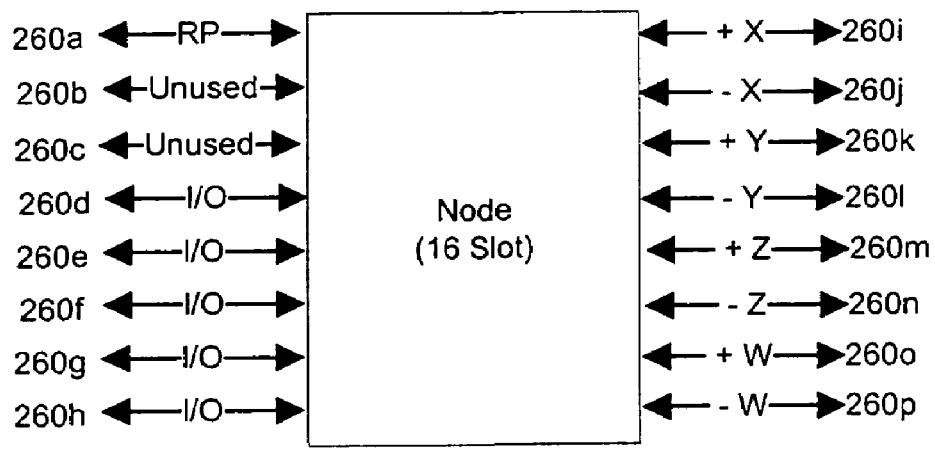
FIG. 7 is a diagram of a node on a scalable multidimensional ring network configured according to an embodiment of the present invention.

FIG. 7 is a diagram of a node on a scalable multidimensional ring network configured according to an embodiment of the present invention. Each NPN 1–27 provides interfaces for connecting Input/Output devices, processing equipment and other NPNs 1–27. In one example a node is a sixteen slot GSR providing interfaces 260a–260p. Eight slots (260i–260p) are used to interface the NPNs 1–27 bi-directionally, along each of the X, Y, Z and W axes. Other slots are used for connecting I/O devices (260d–260h), for example client communications devices 150, 152. Slots on an NPN 1–27 can also be used for process cards, for example route processor (RP) cards (260a). A route processor runs software for handling network routing protocols. Other slots may be idle, and unused (260b–260c), they can be used for adding additional I/O connections, backup Route Processors or additional rings. Of interest in the node of FIG. 7 is the use of two additional slots to created rings along a new access, the W-axis. Rings on the W-axis are bi-directional (+W, −W) and utilize slots 260o and 260p. It will be clear to those skilled in the art that the location of which slots are used to create the new bi-directional rings is not significant to practicing the present invention.

In a specific configuration depicted by FIG. 7, five slots contain I/O devices. Based upon an assumption of 100% utilization of interconnect capacity and uniform distribution of traffic within the scalable multidimensional ring network this configuration will max-out using five I/O devices connected to external nodes. The addition of the W-axis, and the resulting drop in the maximum number of hops from three to two, increases the interconnect capacity between nodes within the scalable multidimensional ring network. This increase in capacity arises because message traffic traveling along interconnects within the scalable multidimensional ring network is reduced when the number of hops required to connect to any two given nodes is reduced (i.e., from three to two). The increase in the number of I/O devices (e.g., from three to five) increases the capacity of the communications network.

Figure 8:
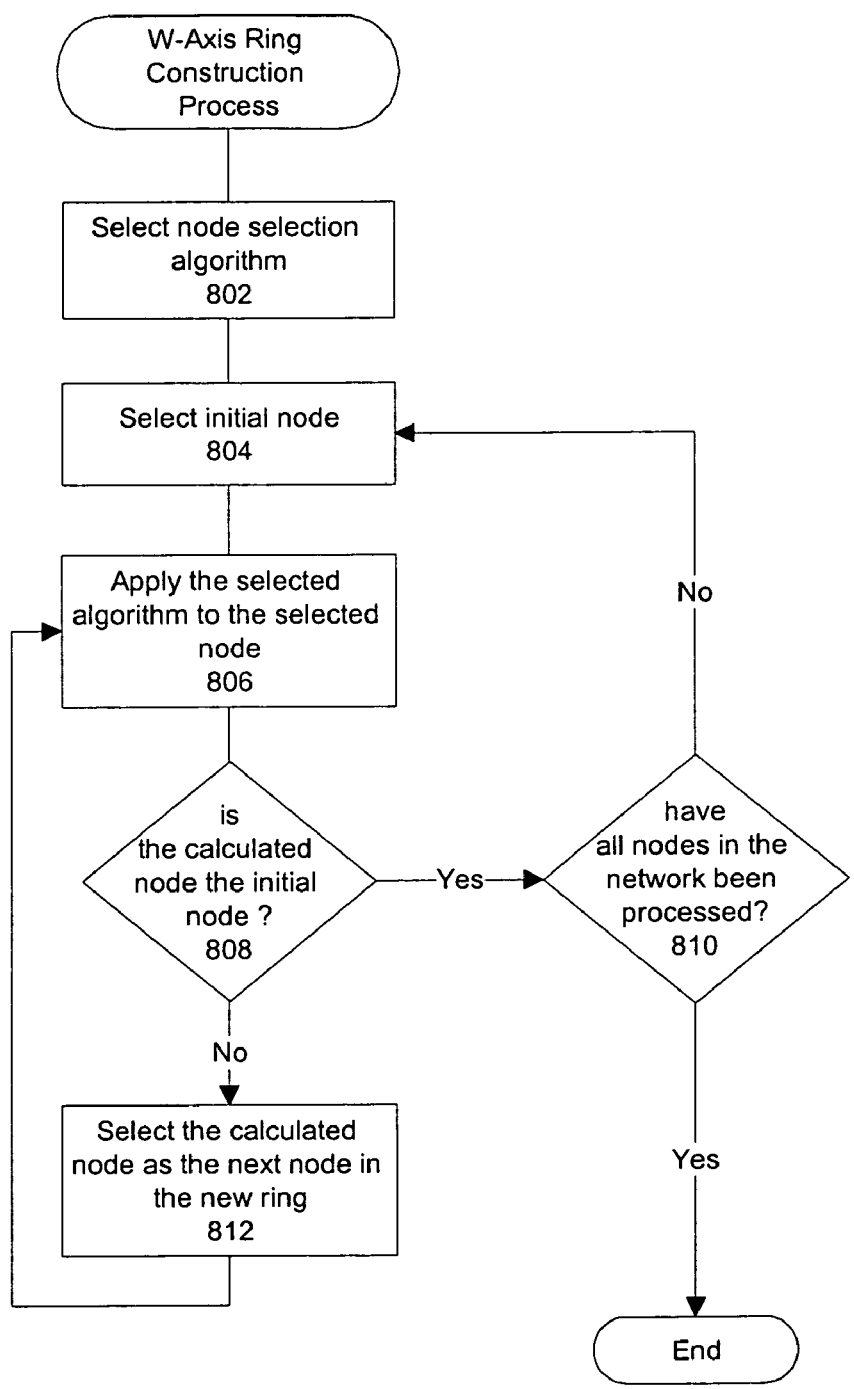
FIG. 8 is a flowchart of a W-axis ring construction process.

FIG. 8 is a flowchart of a W-axis ring construction process. At Step 802 a node selection algorithm is chosen, such as (+X, −Y, −Z) which represents a "rightward" movement along the X-axis, a "downward" movement along the Y-axis and a "backward" movement along the Z-axis to select the next potential node on a ring. The algorithm is used to select nodes that form a ring along a new axis, the W-axis. An initial network processing node in the scalable multidimensional ring network is selected (Step 804) as a first node in a new ring. At Step 806 the node identification algorithm is applied to the selected node to calculate a subsequent node in the new ring. If the calculated node is the initial node (Step 808) then this ring is complete and a check is made to determine if all nodes in the network have been processed (Step 810). If all the nodes in the network have not been processed, then processing continues at Step 804 where a new initial node is selected, otherwise the process ends. If the calculated node is not the initial node (Step 812) then processing continues at Step 806 where the algorithm is applied to the selected node. The W-axis ring construction process results in each node in the network becoming a member of a new ring. This new ring reduces the maximum number of hops needed to transfer information between any two nodes in a scalable multidimensional ring network from three hops to two hops, thus increasing network bandwidth.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of increasing network processing node interconnect capacity and reducing maximum hop count in a scalable multidimensional ring network by creating additional rings comprising the steps of:
   (a) selecting a node identification algorithm;
   (b) selecting an initial network processing node in the scalable multidimensional ring network as a first node in a new ring;
   (c) applying the node identification algorithm to the selected node to calculate a subsequent node in the new ring;
   (d) making the calculated node the selected node;
   (e) repeating steps c–d until the selected node is the initial network processing node, thereby creating the new ring; and
   (f) repeating steps b–e until all nodes in the scalable multidimensional ring network have been processed according to steps (b) through (e), thereby creating all new rings in the scalable multidimensional ring network.

2. The method of claim 1 wherein the node identification algorithm identifies the subsequent network processing node based upon being one hop away bi-directionally in each of the X, Y and Z dimensions.

3. The method of claim 1 wherein the node identification algorithm identifies the subsequent network processing node based upon characteristics of the network processing node comprising:
   network processing node type, network cabling type and distance, and physical location of the network processing node.

4. An apparatus for increasing network processing node interconnect capacity and reducing maximum hop count in a scalable multidimensional ring network by creating additional rings comprising a processor, a memory and a network interface, the processor configured for performing:
 (a) selecting a node identification algorithm;
 (b) selecting an initial network processing node in the scalable multidimensional ring network as a first node in a new ring;
 (c) applying the node identification algorithm to the selected node to calculate a subsequent node in the new ring;
 (d) making the calculated node the selected node;
 (e) repeating the performance of c–d until the selected node is the initial network processing node, thereby creating the new ring; and
 (f) repeating the performance of b–e until all nodes in the scalable multidimensional ring network has been processed, thereby creating all new rings in the scalable multidimensional ring network.

5. The apparatus of claim 4 wherein the node identification algorithm identifies the subsequent network processing node based upon being one hop away bi-directionally in each of the X, Y and Z dimensions.

6. The apparatus of claim 4 wherein the node identification algorithm identifies the subsequent network processing node based upon characteristics of the network processing node comprising:
 network processing node type, network cabling type and distance, and physical location of the network processing node.

7. An apparatus for increasing network processing node interconnect capacity and reducing maximum hop count in a scalable multidimensional ring network by creating additional rings comprising:
 (a) a means for selecting a node identification algorithm;
 (b) a means for selecting an initial network processing node in the scalable multidimensional ring network as a first node in a new ring;
 (c) a means for applying the node identification algorithm to the selected node to calculate a subsequent node in the new ring;
 (d) a means for making the calculated node the selected node;
 (e) a means for repeating the functions recited in c–d until the selected node is the initial network processing node, thereby creating the new ring; and
 (f) a means for repeating the functions recited in b–e until all nodes in the scalable multidimensional ring network has been processed, thereby creating all new rings in the scalable multidimensional ring network.

8. A computer program product comprising:
 a computer usable medium for increasing network processing node interconnect capacity and reducing maximum hop count in a scalable multidimensional ring network by creating additional rings; and
 a set of computer program instructions embodied on the computer usable medium, including instructions to:
 a) select a node identification algorithm;
 b) select an initial network processing node in the scalable multidimensional ring network as a first node in a new ring;
 c) apply the node identification algorithm to the selected node to calculate a subsequent node in the new ring;
 d) make the calculated node the selected node;
 e) repeat c–d until the selected node is the initial network processing node, thereby creating the new ring; and
 f) repeat b–e until all nodes in the scalable multidimensional ring network has been processed, thereby creating all new rings in the scalable multidimensional ring network.

9. A computer data signal embodied in a carrier wave comprising a code segment for increasing network processing node interconnect capacity and reducing maximum hop count in a scalable multidimensional ring network by creating additional rings; and
 a set of computer program instructions embodied in the code segment, including instructions to:
 (a) select a node identification algorithm;
 (b) select an initial network processing node in the scalable multidimensional ring network as a first node in a new ring;
 (c) apply the node identification algorithm to the selected node to calculate a subsequent node in the new ring;
 (d) make the calculated node the selected node;
 (e) repeat c–d until the selected node is the initial network processing node, thereby creating the new ring; and
 (f) repeat b–e until all nodes in the scalable multidimensional ring network has been processed, thereby creating all new rings in the scalable multidimensional ring network.

* * * * *